(Model.)
S. J. WILLIAMS & H. RICHEY.
BAKE PAN.
No. 264,013. Patented Sept. 5, 1882.
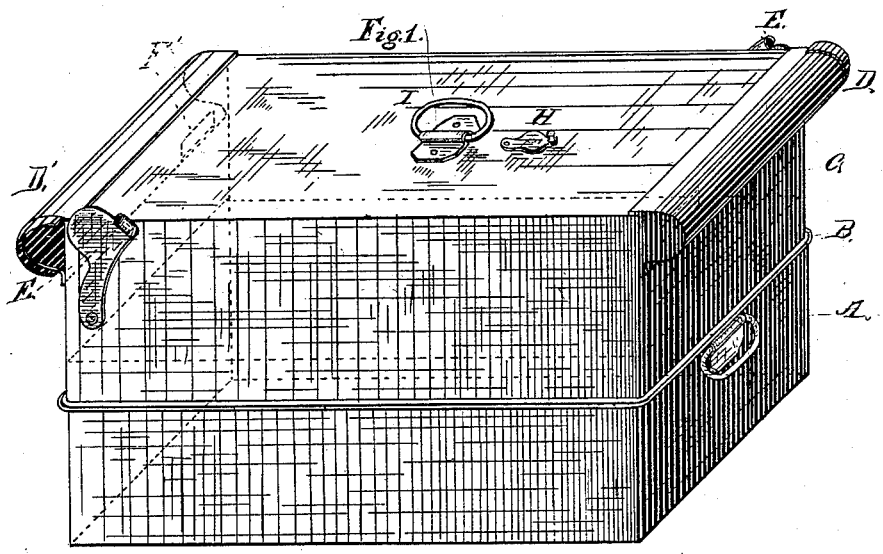
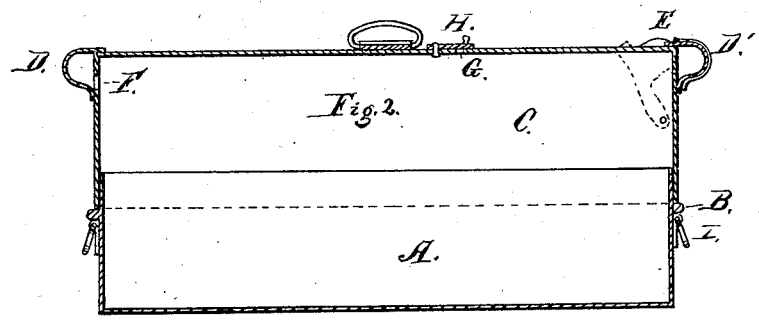
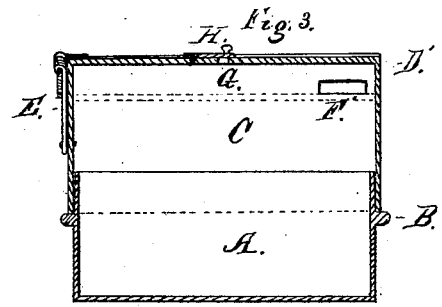
WITNESSES
A. G. Heylmun
J. Heylmun
By
INVENTORS
Seth J. Williams
Hiram Richey
E. W. Johnson
Attorney

UNITED STATES PATENT OFFICE.

SETH J. WILLIAMS AND HIRAM RICHEY, OF SING SING, NEW YORK; SAID WILLIAMS ASSIGNOR TO SAID RICHEY; SAID RICHEY ASSIGNOR OF TWO-THIRDS TO SOPHIA WILLIAMS AND E. MERRITH COLLYER, OF SAME PLACE.

BAKE-PAN.

SPECIFICATION forming part of Letters Patent No. 264,013, dated September 5, 1882.

Application filed March 3, 1882. (Model.)

*To all whom it may concern:*

Be it known that we, SETH J. WILLIAMS and HIRAM RICHEY, citizens of the United States, residing at Sing Sing, in the county of Westchester and State of New York, have invented certain new and useful Improvements in Bake-Pans, of which the following is a specification, reference being had therein to the accompanying drawings, in which—

Figure 1 is a perspective view of our bake-pan. Fig. 2 is a longitudinal sectional view, and Fig. 3 is a transverse section.

This invention has relation to baking-pans; and it consists in the construction and novel arrangement of a cover for bake-pans, as will be hereinafter fully described, and particularly pointed out in the claims.

The object of the invention is to bake bread and cake; but fish, flesh, or fowl may also be cooked in the pan in a scientific manner.

Referring by letter to the accompanying drawings, A designates the body of the pan, provided a short distance below its edge with an encircling stop-bead, B, upon which the edge of the cover C rests when in place, and by means of the lap-joint formed at this point prevents the escape of heat and steam between the body and cover.

At the ends of the cover C are provided lateral air-chambers D D', opening one at each side of the cover, and each provided with a regulating-valve, E, for opening and closing it at pleasure. The lateral air-chambers D D' communicate with the interior of the cover C and with the interior of the pan, when the cover is in place thereon, through openings F F' in the end walls of the cover C, made therein preferably near the closed ends of the lateral air-chambers D D'.

The cover C is also provided through some portion of its top, preferably near the center of the same, with a test-hole, G, provided with a valve, H, for opening and closing it, through which articles under process of baking—such as bread or cake—may be tested by the insertion of a broom-straw or the like through the test-hole into the article, thus avoiding the necessity of removing the cover for this purpose.

The object of the lateral air-chambers D D' is to permit an indirect draft or induced current to be passed over the surface of the article being baked in the pan, to assist in the production of the proper crust or browned surface thereon, and the valves E are provided to regulate the degree of this draft or current or to cut it off entirely, if necessary.

The pan-body is provided with ring or other handles I, one at each end, and the cover C has a similar handle located centrally, as shown.

Having thus fully described our invention, what we claim as new, and desire to secure by Letters Patent of the United States, is—

1. In a baking-pan, the cover C, provided with the lateral air-chambers D D' at its ends, communicating therewith through the openings F F', and provided with the valves E for regulating the draft or current to the pan, substantially as specified.

2. In a baking-pan, the combination, with the body A, having the stop-bead B below its edge, of the cover C, resting by its edge upon the stop-bead B, and having the lateral air-chambers D D', with openings F F' and valves E, and the test-hole G and valve H, substantially as and for the purposes specified.

In testimony whereof we affix our signatures in presence of two witnesses.

SETH J. WILLIAMS.
    HIRAM RICHEY.

Witnesses:
 ABM. J. UNDERHILL,
 PIERCE REYNOLDS.